US012210576B1

(12) United States Patent
Yang et al.

(10) Patent No.: US 12,210,576 B1
(45) Date of Patent: Jan. 28, 2025

(54) MODELING SEASONAL RELEVANCE FOR ONLINE SEARCH

(71) Applicant: Amazon Technologies, Inc., Seattle, WA (US)

(72) Inventors: Haode Yang, Seattle, WA (US); Dan Bu, Kirkland, WA (US); Roberto Fernandez Galan, Bellevue, WA (US); Parth Gupta, Gandhinagar (IN); Dongmei Jia, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 262 days.

(21) Appl. No.: 17/404,634

(22) Filed: Aug. 17, 2021

(51) Int. Cl.
| | | |
|---|---|---|
| *G06F 16/953* | (2019.01) | |
| *G06F 16/33* | (2019.01) | |
| *G06F 40/284* | (2020.01) | |
| *G06F 40/30* | (2020.01) | |
| *G06N 3/08* | (2023.01) | |
| *G06Q 30/0201* | (2023.01) | |
| *G06Q 30/0202* | (2023.01) | |
| *G06Q 30/0601* | (2023.01) | |

(52) U.S. Cl.
CPC ........ *G06F 16/953* (2019.01); *G06F 16/3344* (2019.01); *G06F 40/284* (2020.01); *G06F 40/30* (2020.01); *G06N 3/08* (2013.01); *G06Q 30/0201* (2013.01); *G06Q 30/0202* (2013.01); *G06Q 30/0625* (2013.01); *G06Q 30/0631* (2013.01)

(58) Field of Classification Search
CPC .. G06F 16/953; G06F 16/3344; G06F 40/284; G06F 40/30; G06N 3/08; G06Q 30/0201; G06Q 30/0202; G06Q 30/0625; G06Q 30/0631
See application file for complete search history.

(56) References Cited

U.S. PATENT DOCUMENTS

| | | | | |
|---|---|---|---|---|
| 11,604,794 B1 | * | 3/2023 | Nallapati | .......... G06F 16/24522 |
| 2009/0037355 A1 | * | 2/2009 | Brave | ................. G06F 16/9535 |
| | | | | 706/45 |
| 2019/0327331 A1 | * | 10/2019 | Natarajan | ............. G06F 16/243 |
| 2021/0382923 A1 | * | 12/2021 | Gragnani | ............ G06F 16/3329 |

(Continued)

OTHER PUBLICATIONS

Huang et al. "A New Feature Based Deep Attention Sales Forecasting Model for Enterprise Sustainable Development", Published Sep. 27, 2022. Teaches sales forcast in e-commerce in p. 3 and a Softmax function in p. 8. (Year: 2022).*

(Continued)

*Primary Examiner* — Matthew J Ellis
(74) *Attorney, Agent, or Firm* — K&L Gates LLP

(57) ABSTRACT

Techniques are generally described for modeling seasonal relevance for online search. A first query or item comprising text is received. A language model may be used to generate a plurality of token embeddings representing the text. In some cases, the first neural network may predict a seasonal relevance vector for the first query or item based on the plurality of token embeddings, the seasonal relevance vector being predicted based at least in part on a similarity between the text of the first query or item and at least one other query/item for which monthly concentration data is available. The seasonal relevance vector, including a respective seasonal relevance score for each month of a year, may be output.

20 Claims, 7 Drawing Sheets

(56) References Cited

U.S. PATENT DOCUMENTS

2021/0406988 A1* 12/2021 Oh .................... G06Q 30/0279
2022/0230629 A1*  7/2022 Zhu .................... G06F 40/279
2022/0343190 A1* 10/2022 Kwok .................. G06F 3/0482

OTHER PUBLICATIONS

Rosvall et al. Data-Driven Models for E-commerce Sales Predictions, https://www.diva-portal.org/smash/get/diva2:1672792/FULLTEXT01.pdf, 2022, pp. 1-10. Teaches forcasting business time series in p. 8 with a possibility of using Softmax in p. 7. (Year: 2022).*

Benboubker et al. Comparative Analysis in Sales Forecasting: Classical Methods and Neural Networks, http://ieomsociety.org/toronto2019/papers/488.pdf, Oct. 25, 2019, pp. 1369-1379. Teaches historical data for forecasting in a competitive market in p. 1369 and a Softmax function in 1378. (Year: 2019).*

Yiwei et al. "Future-Aware Trend Alignment for Sales Predictions", Oct. 21, 2020, (Year: 2020).*

Bai et al. Dec. 30, 2020, "Enhanced Natural Language Interface for Web-Based Information Retrieval", https://ieeexplore.ieee.org/stamp/stamp.jsp?arnumber=9311114, pp. 4233-4239 (Year: 2020).*

* cited by examiner

| Item/query text | m=1 | m=2 | m=3 | m=4 | m=5 | m=6 | m=7 | m=8 | m=9 | m=10 | m=11 | m=12 |
|---|---|---|---|---|---|---|---|---|---|---|---|---|
| Down jacket (S) | 0.319 | 0.179 | 0.05 | 0.007 | 0.001 | 0.002 | 0.002 | 0.009 | 0.031 | 0.123 | 0.146 | 0.132 |
| Down jacket (XL) | 0.206 | 0.105 | 0.044 | 0.005 | 0.004 | 0.003 | 0.000 | 0.004 | 0.046 | 0.206 | 0.217 | 0.161 |
| ... | | | | | | | | | | | | |

Training data 302

FIG. 3

MODELING SEASONAL RELEVANCE FOR ONLINE SEARCH

BACKGROUND

Search engine optimization is used to improve the relevance of search results for any given query. Search engines may be used to find websites and/or other content. For example, e-commerce services may use search engines to surface products relevant to customer queries. In various examples, a list of content may be retrieved and/or ranked for a given query. The goal of search engine optimization is often to connect users to more relevant content and/or to increase the quality of traffic coming to websites and/or content that are highly ranked by the search engine.

BRIEF DESCRIPTION OF DRAWINGS

FIG. 3 is an example of seasonal relevance data for two items, in accordance with various aspects of the present disclosure.

DETAILED DESCRIPTION

Figure 1:
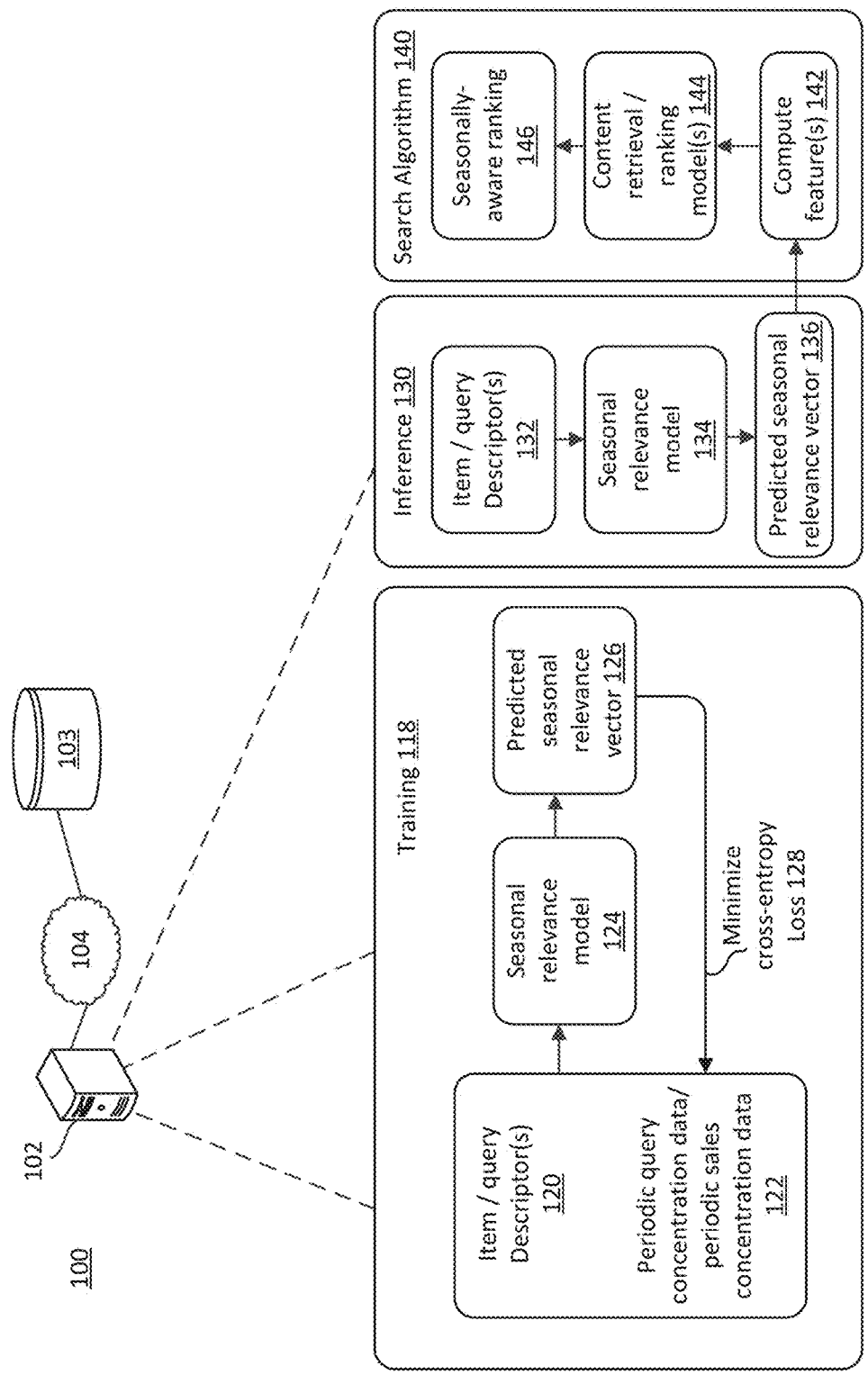
FIG. 1 is a diagram depicting an example system for modeling seasonal relevance for online search, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Machine learning techniques, such as those described herein, are often used to form predictions, solve problems, recognize objects in image data for classification, etc. For example, machine learning techniques may be used to detect objects represented in image data and/or translate text from one spoken language to another. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLU) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize the cost. For example, the machine learning model may use a gradient descent algorithm to incrementally adjust the weights to cause the most rapid decrease to the output of the loss function. The method of updating the parameters of the machine learning model is often referred to as back propagation.

Transformer models (e.g., transformer machine learning models) are machine learning models that include an encoder network and a decoder network. The encoder takes an input and generates feature representations (e.g., feature vectors, feature maps, etc.) of the input. The feature representation is then fed into a decoder that may generate an output based on the encodings. In natural language processing, transformer models take sequences of words as input. For example, a transformer may receive a sentence and/or a paragraph comprising a sequence of words as an input. In various examples described herein, a transformer may instead (or, in addition) receive a set of images of objects as input. In various examples, the images may represent items that are described by the text.

In general, the encoder network of a transformer comprises a set of encoding layers that processes the input data one layer after another. Each encoder layer generates encodings (referred to herein as "embeddings"). These embeddings include feature representations (e.g., feature vectors and/or maps) that include information about which parts of the input data are relevant to each other. For example, for each input sequence the encoder layers may determine which parts of the input are relevant to other parts of the input. Each encoder layer passes its output to the next encoder layer. The decoder network of the transformer takes the embeddings output by the encoder network and processes them using the encoded contextual information and the encoder-decoder attention mechanism to generate output embeddings. Each encoder and decoder layer of a transformer uses an attention mechanism, which for each input, weighs the relevance of every other input and draws information from the other inputs to generate the output. Each decoder layer also has an additional attention mechanism which draws information from the outputs of previous decoders, prior to the decoder layer determining information from the encodings. Both the encoder and decoder layers have a feed-forward neural network for additional processing of the outputs, and contain residual connections and layer normalization steps. In some examples described herein, transformer-based models and/or other machine learning models that use the attention mechanism may be used to model seasonal relevance of items and/or queries. In turn, seasonal relevance data for items and/or queries may be used to improve online search by surfacing items that are more likely to be relevant based on seasonality.

Scaled Dot-Product Attention

The basic building blocks of the transformer are scaled dot-product attention units. When input data is passed into a transformer model, attention weights are calculated between every token simultaneously. The attention unit produces embeddings for every token in context that contain information not only about the token itself, but also a weighted combination of other relevant tokens weighted by the attention weights.

Concretely, for each attention unit the transformer model learns three weight matrices: the query weights $W_Q$, the key weights $W_K$, and the value weights $W_V$. For each token, the input embedding $x_i$ is multiplied with each of the three weight matrices to produce a query vector $q_i = x_i W_Q$, a key vector $k_i = x_i W_K$, and a value vector $v_i = x_i W_V$. Attention weights are calculated using the query and key vectors: the attention weight $a_{ij}$ from token i to token j is the dot product between $q_i$ and $k_j$. The attention weights are divided by the square root of the dimension of the key vectors, $\sqrt{d_k}$, which stabilizes gradients during training. The attention weights are then passed through a softmax layer that normalizes the weights to sum to 1. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $a_{ij}$, the attention from i to each token j.

The attention calculation for all tokens can be expressed as one large matrix calculation, which is useful for training due to computational matrix operation optimizations which make matrix operations fast to compute. The matrices Q, K, and V are defined as the matrices where the ith rows are vectors $q_i$, $k_i$, and $v_i$ respectively.

$$\text{Attention}(Q, K, V) = \text{softmax}\left(\frac{QK^T}{\sqrt{d_k}}\right)V$$

Multi-Head Attention

One set of ($W_Q$, $W_K$, $W_V$) matrices is referred to herein as an attention head, and each layer in a transformer model has multiple attention heads. While one attention head attends to the tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next token, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders.

The first encoder takes position information (e.g., positional embeddings) and embeddings of the input data (e.g., embeddings for tokens representing unigrams, bigrams, etc.) as its input, rather than encodings. The position information is used by the transformer to make use of the order of the input data (e.g., the order of words in an item title, description, etc.). In various examples described herein, the position embedding may describe a spatial relationship of a plurality of tokens relative to other tokens.

Each decoder layer comprises three components: a self-attention mechanism (e.g., scaled dot product attention), an attention mechanism over the encodings (e.g., "encoder-decoder" attention), and a feed-forward neural network. The decoder functions in a similar fashion to the encoder, but an additional attention mechanism is inserted which instead draws relevant information from the encodings generated by the encoders. In a self-attention layer, the keys, values and queries come from the same place—in the case of the encoder, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

In some examples described herein, seasonal relevance for content (e.g., products, items) and/or search queries may be modeled using machine learning architectures other than transformers, but which still employ the attention mechanism to model the relative importance of the input data (e.g., words in an item's title/description, image features, etc.).

Product discovery in e-commerce is mainly attributed to search and recommendation. Product relevance in e-commerce search further depends on various dimensions such as query wording, user, timing, and/or context. While the user, query and context dimensions are well captured in information retrieval research and are incorporated in e-commerce search engines, the time aspect is under-addressed, especially from a relevance perspective. As a comparison, time is well studied in web search under the area of temporal information retrieval. Several studies have been devoted to profile temporal dimensions of queries, such as explicit mentions of time and/or implicit sensitivity to time.

Seasonality in online search plays an important role. A query "jacket" has a different set of relevant documents in winter relative to summer. However, with a limited context and an open-ended query like "jacket", the onus is on the search engine to show more seasonally-relevant documents, or to at least not over index to user's behavior captured during the preceding season. Therefore, it is important for the search engines to be seasonally aware and to incorporate such information in ranking. In e-commerce, seasonality has also importance beyond search. For example, logistics can leverage seasonality signal for demand forecasting and inventory management. It also helps to recommend more seasonally relevant products.

Described herein are various approaches to identify seasonality in queries and products, and to define features that capture such seasonal information. These features can be consumed by standard learning-to-rank (LTR) frameworks (e.g., online search algorithms). Comprehensive offline and online experiments have revealed importance of handling seasonality in online search by improved metrics, including 0.62% more clicks, 1.22% more add-to-carts, and 2.20% more purchases.

Seasonality of queries and items may be defined using query volume (e.g., incidences of queries and/or query keywords) and product sales, respectively, as described herein. According to experiments conducted using the proposed definitions of seasonal relevance, 39% of queries are highly seasonally relevant to the time of search, and 42% of total purchases in a year are made following those queries. In various examples, predictive machine learning-based approaches are used to model seasonal relevance so that applications are not constrained by the cold-start problem and so that noise in the data is reduced. In various examples, the approaches may use language modeling to learn seasonal relevance from query text and product titles, respectively. Although, the approaches described herein are not limited to textual input and may also learn seasonality from image features (e.g., using a convolutional neural network (CNN) to extract visual features).

In an example, product title may be used to model seasonal relevant as it may comprise key product attributes that help profile a product's seasonal properties, such as sleeve length, color, fabrics, etc. In some examples, the learning task may be performed using pre-trained text embeddings (e.g., from a pre-trained language model) that may capture semantics of text. In addition, in some examples, a neural network architecture may also be employed. The neural network architecture may use the self-attention mechanism to identify words in product titles that are critical to predict seasonal relevance. In various examples, the seasonal relevance modeling techniques described herein may be used to not only detect products which are frequently purchased in each of the four seasons (or other time periods), but also those searched for during special occasions such as holidays, the back-to-school period, etc. Ranking features may be generated based on predictions of the neural network model and LTR ranker models may be trained using these features to make search ranking season aware.

The performances of the proposed methods and systems may be evaluated both offline and online. In the offline case, ranking metrics such as normalized discounted cumulative gain (NDCG) change may be evaluated when seasonal relevance is incorporated. In the online case, an A/B test has been used on 784 MM searches with and without the seasonal relevance signals described herein. Experimental results suggest that the systems and techniques described herein significantly increase the purchase rate, which underlines the improved user experience achieved via seasonal relevance.

FIG. 1 is a diagram depicting an example seasonal relevance modeling system 100 may be used to model seasonal relevance for online search, in accordance with various aspects of the present disclosure. In various examples, one or more computing devices 102 that may be configured in communication over a network 104 may implement the seasonal relevance modeling system 100. Network 104 may be a communication network such as a local area network (LAN), a wide area network (such as the Internet), or some combination thereof. The one or more computing devices 102 implementing the seasonal relevance modeling system 100 may communicate with non-transitory computer-readable memory 103 (e.g., either locally or over network 104). Non-transitory computer-readable memory 103 may store instructions that may be effective to perform one or more of the various techniques described herein. For example, the instructions may be effective to implement one or more of the various machine learning models described herein.

In the example of FIG. 1, training 118 and inference 130 for seasonal relevance modeling system 100 are depicted as separate blocks. Additionally, a search algorithm 140 (e.g., an LTR algorithm) may be implemented as a separate system and may accept the predicted seasonal relevance vector 136 output by seasonal relevance modeling system 100 as an input, as described herein.

During training 118 item/query descriptor(s) 120 may be received. As described herein, the seasonal relevance modeling system 100 may be used to model the seasonal relevance of both items (or other content) and queries. In the case of items, the item/query descriptor(s) 120 may comprise any text associated with an item. For example, text describing the item, a title of the item, etc., may be used. In the case of queries, the text of the query itself may be used as the item/query descriptor(s) 120. In some cases, the text data may be pre-processed in various ways (e.g., removal of stop words, lemmatization, etc.) to generate tokens (e.g., n-grams) representing the item/query descriptor(s) 120. In some further examples, images of items may be used as an additional input for item descriptors.

Feature data may be generated to numerically represent the input text data and/or image data (e.g., the item/query descriptor(s) 120). For example, a pre-trained language model may be used to generate embedding data that represents the input text tokens. In another example, a CNN may be used to generate feature data representing image features.

During training 118, item/query descriptors 120 (e.g., item title text) may be paired with periodic query concentration data/periodic sales concentration data 122. As described in further detail below, for item text, the periodic sales concentration of the item over historical time periods may be provided. For example, a vector having an element corresponding to each month of the year, with a normalized per-month percentage of sales may be the periodic sales concentration data for an item. In the query context, a periodic query concentration (e.g., a number of times a particular query was received (or a percentage representing the proportional incidence of the query) during a particular time period may be represented using a vector. An example, of periodic sales concentration data is shown in FIG. 3.

Pair-wise data may comprise item/query descriptor(s) 120 paired with corresponding periodic query concentration data/periodic sales concentration data 122. For example, the item title "black winter coat" may be paired with a vector representing a normalized proportion of sales for the item over the past year. In a query example, the query text "sundress" may be paired with a vector representing per-month proportion of incidences of queries for "sundress" during the past year. It should be appreciated that other time periods may be used (besides per-month and/or per-year) to represent periodic query concentration data/periodic sales concentration data 122.

Figure 2:
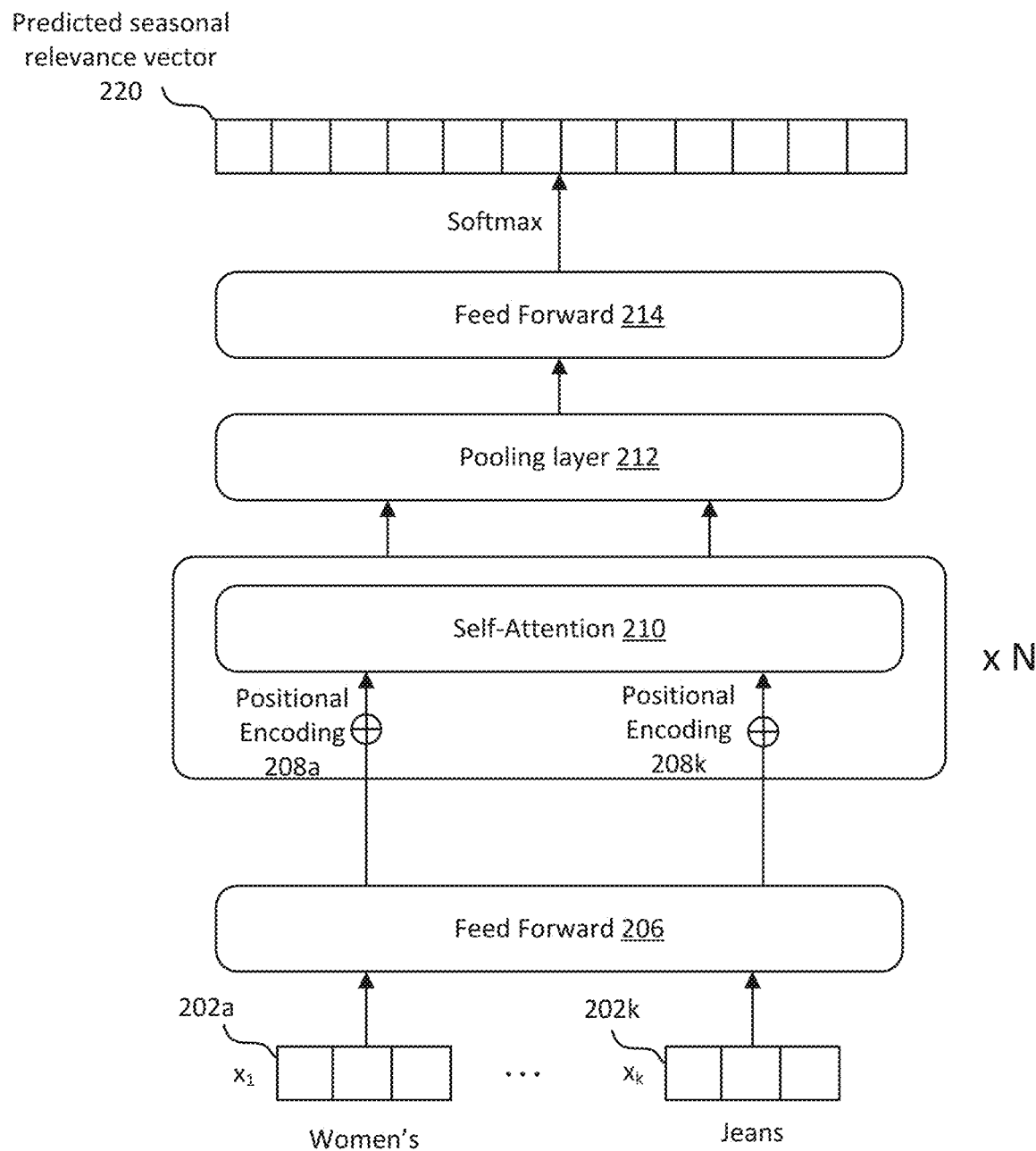
FIG. 2 is a block diagram illustrating a machine learning architecture for modeling seasonal relevance for items, queries, and/or other content, in accordance with various aspects of the present disclosure.

The pair-wise data may be used to train a seasonal relevance model 124. In various examples, the seasonal relevance model 124 may be implemented as a neural network including one or more self-attention layers. An implementation of the seasonal relevance model 124 is depicted in FIG. 2 and is described in further detail below. The seasonal relevance model 124 may be trained to predict the seasonal relevance vector 126 for the input pair-wise data. Accordingly, the periodic concentration data/periodic sales concentration data 122 may be used as a ground truth signal. The cross-entropy loss 128 may be minimized between the predicted seasonal relevance vector 126 and the periodic query concentration data/periodic sales concentration data 122.

During inference 130, the seasonal relevance model 134 may receive the item/query descriptor(s) 132. Item/query descriptor(s) 132 may comprise the item title, query text, item description, item images, etc. As described above, text that is included in the item/query descriptor(s) 132 may be pre-processed and/or tokenized. A pre-trained language model may be used to generate embeddings for the item/query descriptor(s) 132 prior to input into the seasonal relevance model 134. The seasonal relevance model 134 may output a predicted seasonal relevance vector 136. The seasonal relevance vector 136 may represent the relevance of the query/item to each different time period.

The predicted seasonal relevance vector 136 may be used to train search algorithm 140 (e.g., content retrieval/ranking model(s) 144. Accordingly, the predicted seasonal relevance vector 136 may be used to compute feature(s) 142 (e.g., numerical representations of the form taken as input by the content retrieval/ranking model(s) 144). The feature(s) 142 may be input into the content retrieval/ranking model(s) 144. The content retrieval/ranking model(s) 144 may retrieve and/or rank content to generate a seasonally-aware ranking 146. For example, for the query "jacket" received during the month of May, results that include jackets that have historically been purchased more during spring months may be ranked more highly relative to jackets purchased during other times of the year.

Products in e-commerce may be seasonal (e.g., rain jacket) or uniform throughout the year (e.g., jeans). For example, sales in fashion categories follow both seasonal and holiday patterns, reflecting the change in customer preference for product types and fashion styles throughout the year.

For example, two dresses with different styles may have dramatically different patterns in their monthly sales. A floral print t-shirt dress may have the majority of its sales concentrated over March and September, while a long-sleeved bodycon dress may have the majority of its sales from October to March. E-Commerce search engines may incorporate such user preferences while modeling relevance. Towards this, seasonal relevance is defined for queries and products (e.g., items). A predictive approach may be used to learn seasonal relevance from query text and product titles, as described in further detail below.

Definition of Seasonal Relevance

Seasonal relevance of a product (e.g., an item or other content) may be derived from its sales, with the intuition that the demand and thus the sales of a product go up when it becomes in-season, reflecting customers' perception of seasonal relevance. In various examples discussed herein, we take a time period of a month is used. However, it should be appreciated that a time period of any desired length may be used in accordance with the techniques described herein. Suppose E is a purchase event, A is the product purchased and M is the month of purchase. For any pair of product a and month m where $m \in \{1, \ldots, 12\}$, seasonal relevance may be defined as $$P_{am} = P(M=m|A=a)$$

and $P_a = (P_{a1}, \ldots, P_{a12})$ is essentially a probability distribution. Given a product a, $P_{am}$ can be estimated by the proportion of its annual sales concentrated in month m. Instead of using its raw monthly sales, the numbers may be normalized with the overall sales (or total queries, in the query context) of the month in order to isolate the trends in product sales from those caused merely by a change in overall sales. Formally:

$$Q_{am} = \frac{\frac{S_{am}}{S_m}}{\sum_{m'=1}^{12} \frac{S'_{am}}{S'_m}}$$

may be used as an estimator of $P_{am}$, where Sam is the sales of product a in month m and $S_m$ is the overall sales of the month. Vector $Q_a = (Q_{a1}, \ldots, Q_{a12})$ may be referred to as product monthly sales concentration (MSC). For queries, the same formulation may be used. The seasonal relevance between a query and a month may be defined as the probability of seeing the query in the given month conditioned on its occurrence, and can be estimated with query volume. $Q_a$ then becomes query monthly volume concentration (MVC). In various examples herein, MSC and MVC may more generally be referred to as "periodic sales concentration data" and "periodic query concentration data", respectively. Models may be trained using historical periodic sales concentration data (for item relevance) and/or historical periodic query concentration data (e.g., MVC for query seasonal relevance).

In various examples below, a predictive approach to modeling seasonal relevance for online search is described. The described approaches apply to both products and queries. However, for brevity and to avoid repetition, product seasonal relevance is described in detail, but the techniques for use with queries can be derived accordingly.

Modeling Seasonal Relevance

As discussed in above, seasonal relevance for product a in a month m can be defined as $P_{am}$. Estimating $P_{am}$ from data through $Q_{am}$ has two potential issues: (i) it does not work for products that are recently launched and thus have no historical sales data; (ii) product sales in a specific month as estimated by $Q_{am}$ can be noisy for various reasons such as discoverability and user behavior. For example, as shown in the example seasonal relevance data of FIG. 3, the same down jacket with 2 different sizes had different MSCs. While both jackets were most popular from October to February, the XL-sized jacket's MSC was skewed toward the end of the year and the size S sized jacket's MSC was skewed towards the beginning of the year. To tackle the aforementioned cold start problem and reduce noise, a predictive approach to learn $P_{am}$ from product titles and $Q_{am}$ may be used. Product titles in an e-commerce store typically contain key attributes of each product, such as sleeve length, color, fabrics, etc. These attributes help profile a product's seasonal properties, and thus should help in predicting $P_{am}$.

Suppose a set of products $\mathbb{A}$ is observed, along with $\mathbb{Q} = \{Q_a: a \in \mathbb{A}\}$ and product titles $\mathbb{X} = \{X_a: a \in \mathbb{A}\}$. The seasonal relevance of these products is unknown and is denoted as $\mathbb{P} = \{P_a: a \in \mathbb{A}\}$. Assume there is a function $f(\theta): \mathbb{X} \to \mathbb{P}$ that is parametrized by $\theta$ and maps a product title $X_a$ to a seasonal relevance vector $P_a$. The function $f$ may be learned by minimizing $$L(\theta) = \frac{1}{|\mathbb{A}|} \sum_{a \in \mathbb{A}} l(Q_a, f(X_a; \theta))$$

where l is chosen to be the following cross-entropy loss, since $Q_a$ and $f(X_a; \theta)$ can be viewed as two probability distributions:

$$l(u, v) = -\sum_{m=1}^{12} u_m \log v_m$$

The learning task may include transforming text into numerical values. In particular, dense vector representations of words may be generated using a pre-trained language model, such as FastText (e.g., to generate FastText embeddings). Such embeddings handle out-of-vocabulary and low-frequency words well and may offer good results for noisy text such as product titles in e-commerce. Additionally, such embeddings are lightweight (e.g., in terms of size of data and dimensionality) and improve efficiency of the system. Neural networks may be used to model function f because of their proven track record of semantically modeling text for downstream tasks.

FIG. 2 is a block diagram illustrating a machine learning architecture for modeling seasonal relevance for items, queries, and/or other content, in accordance with various aspects of the present disclosure. In the depicted example of FIG. 2, the input is a product title tokenized and represented in FastText embeddings. For example, the product title text "Women's . . . Jeans" may be tokenized and the tokens may be input into a pre-trained FastText language model to generate the FastText embeddings $202a, \ldots, 202k$ (e.g., numeric representations representing the input product title text). The subsequent feed-forward layer 206 may be used to modify the FastText embeddings (e.g., by reducing the dimensionality) for input into the self-attention layer(s) 210. The embeddings output by feed-forward layer 206 may be provided along with positional encodings $208a, \ldots, 208k$ (e.g., positional embeddings for each token) to the self-attention layer(s) 210. Self-attention layer(s) 210 may be used to extract the relationship of words in the product title before reducing them into a single embedding (e.g., via pooling layer 212) for the feed forward prediction layer 214. For example, the self-attention layers 210 may output per-token embeddings and the pooling layer 212 may apply average pooling (or another type of pooling) to generate a sentence-level embedding representing the entire title. The feedforward layer 214 may generate a predicted seasonal relevance vector 220 and a Softmax function may be applied to represent the seasonal relevance values as an output vector of values that sum to 1. In an example where the relevant time period unit is a month, the predicted seasonal relevance vector 220 may have 12 elements, one for each month of a year. Accordingly, the value of each element may represent the predicted seasonal importance for that month (e.g., with higher values representing more seasonal importance relative to lower values). In other words, each of the twelve elements of the output vector may represent a seasonality score representing a prediction of seasonal relevance for the item for that month, wherein the prediction of seasonal relevance is determined based on monthly sales concentrations (MSC) of items comprising semantically-similar text.

Various other neural network architectures apart from the one specifically shown and described in reference to FIG. 2 may be used in accordance with the various techniques described herein. For example, a simple feedforward network may be used that directly ingests sentence-level (e.g., the entire product title) embeddings. In some other examples, a recurrent neural network architecture, such as a gated recurrent unit (GRU) may be used. In still other examples, a transformer-based model such as bidirectional encoder representations from transformers (BERT) may be used.

Figure 7:
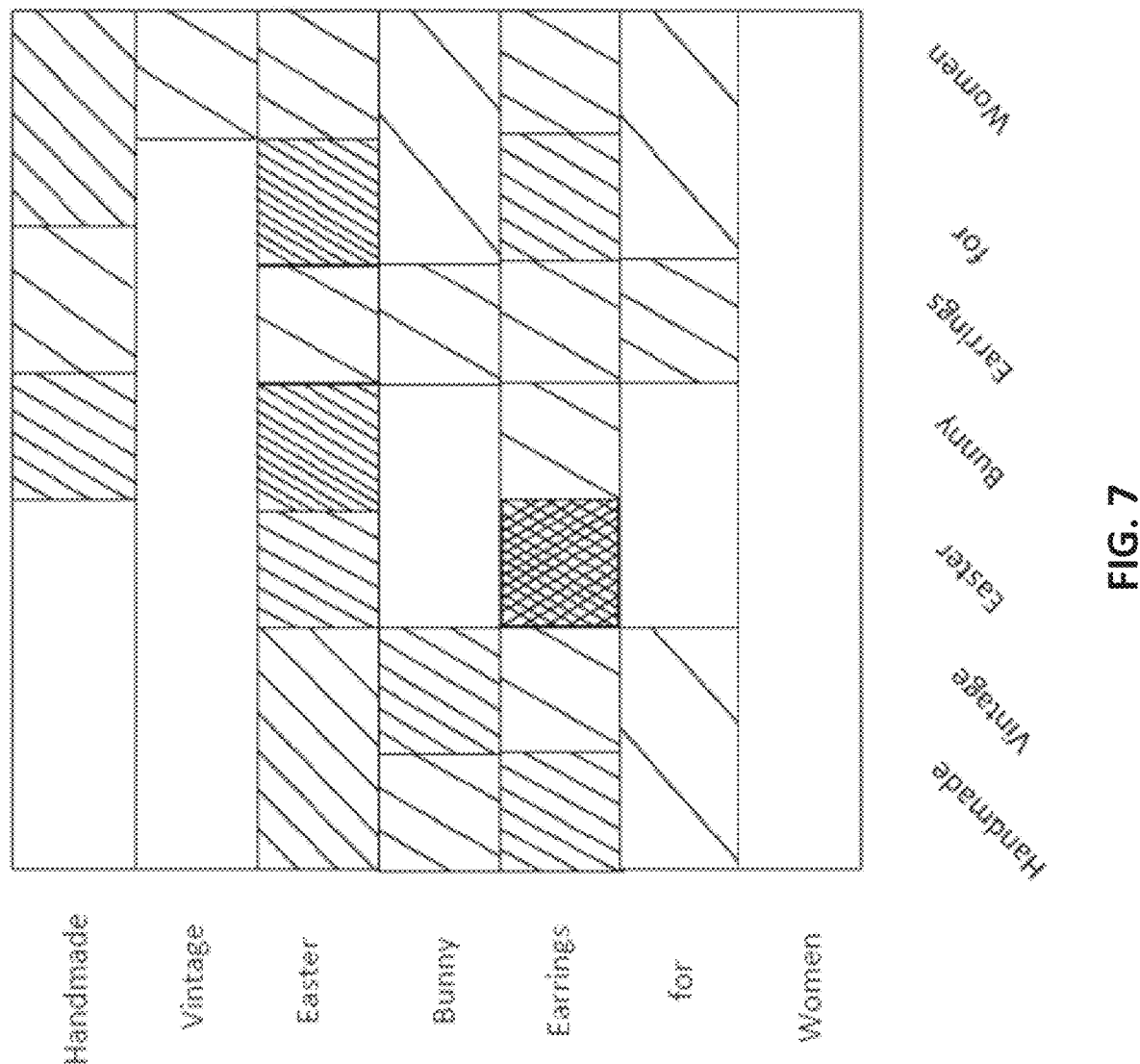
FIG. 7 depicts an example visualization of the self-attention weights generated by the neural network model of FIG. 2 for a specific product title, in accordance with various aspects of the present disclosure.

BERT and other transformer-based models use self-attention, which may be particularly helpful in capturing information relevant to holidays. However, such models can often be relatively heavy weight (e.g., having millions of parameters) for the learning task at hand. FIG. 7 depicts an example visualization of the self-attention weights generated by the neural network model of FIG. 2 for a product titled Handmade Vintage Easter Bunny Earrings for Women.

A darker color indicates a higher attention weight, and thus a larger impact to subsequent layers, including the final prediction layer (e.g., feed forward layer 214 of the neural network architecture shown in FIG. 2). The two rows with the darkest colors are for "Easter" and "Earrings." This may be expected since these are the first two words that a human brain will likely pay attention to when making a judgement of the occasions for which the product is best suited. Among them, "Easter" is critical to predict seasonal relevance.

Returning to FIG. 2, the model may have a relatively low number of trainable parameters especially as compared to BERT. For example, one implementation of the architecture has 4.4 K trainable parameters with 2 self-attention layers, each having 4 heads. To construct the datasets for training and testing, the annual sales data for a calendar year and grouped products and months to build the MSC vector $Q_a$ for each product. Sampling was then performed for a balanced dataset, giving all products an equal probability.

The neural network model may be evaluated with regard to the effectiveness of predictions to the actual MSC vector $Q_a$. The performance is measured in terms of cross-entropy loss and cosine similarity.

FIG. 3 is an example of seasonal relevance data for two items, in accordance with various aspects of the present disclosure. FIG. 3 depicts two instances of pair-wise training data 302. The first pair-wise training sample includes the item title text "Down jacket (S)" and depicts the seasonal relevance scores (e.g., MSC) for each month of the year. In some examples herein, the seasonal relevance scores (e.g., MSC, MVC, etc.) may be represented as a seasonality vector. Similarly, the second pair-wise training sample includes the item title text "Down jacket (XL)" and depicts the seasonal relevance scores (e.g., MSC) for each month of the year as a seasonality vector of twelve numbers.

However, instead of being training data, the examples depicted in FIG. 3 are also representative of the output seasonal relevance vector for the given text inputs (which may be either product text or query text). Accordingly, the per-month scores may have been predicted using the neural network architecture shown in FIG. 2. In the example of FIG. 3, the "Down jacket (S)" may be most seasonally relevant from October (m=10) through February (m=2). Similarly, the "Down jacket (XL)" product, being a similar product, may also be most seasonally relevant from October through February, since these are the months with the highest seasonal relevance scores. In various examples, instead of using MSC, per-month (or other time period) query keyword incidences may be used as periodic query concentration data. In general, the normalized periodic query concentration data may be determined in the same way as described above with respect to the periodic sales concentration data.

Figure 4:
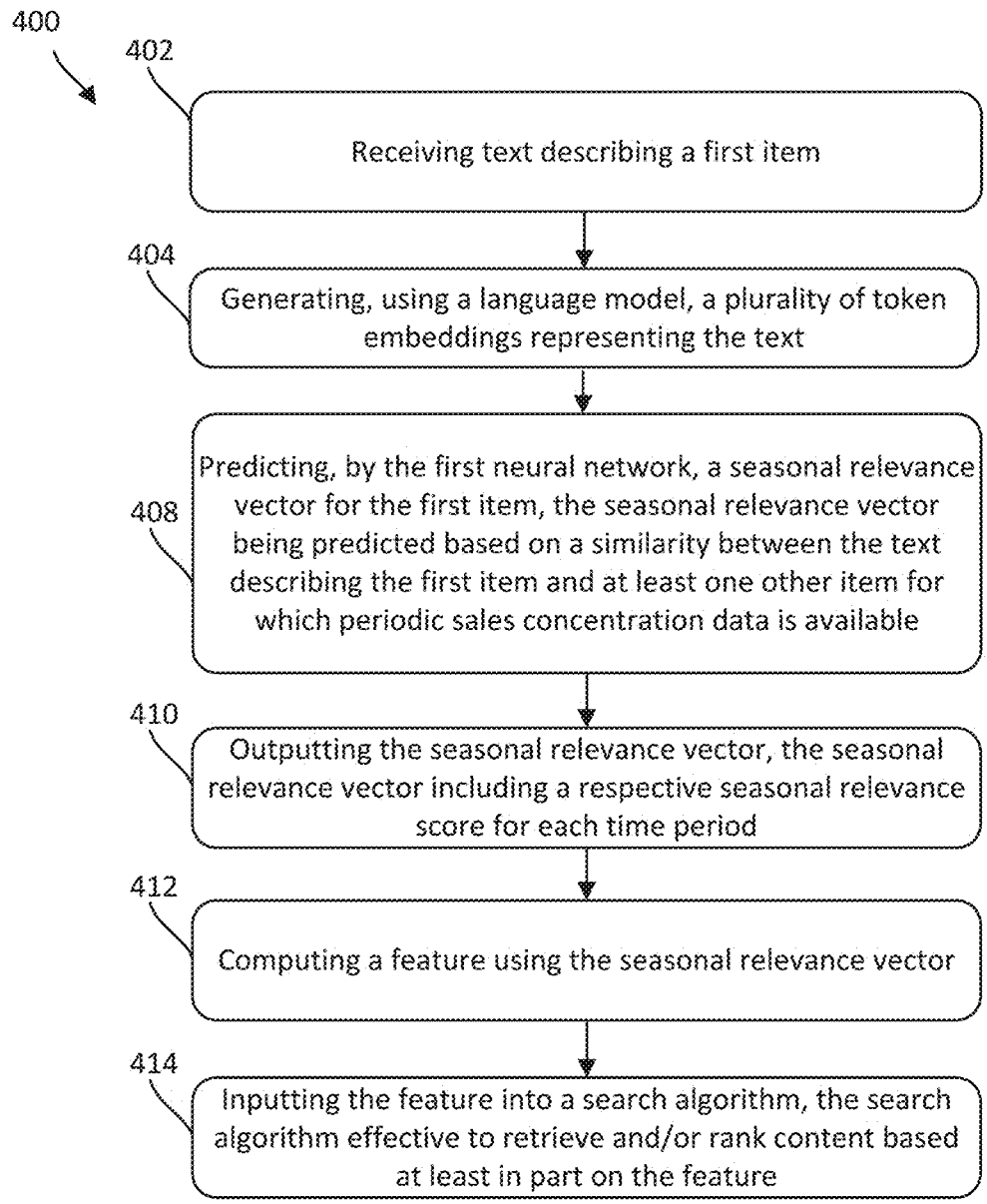
FIG. 4 depicts an example process for determining seasonal relevance for search, in accordance with various aspects of the present disclosure.

FIG. 4 depicts an example process 400 for determining seasonal relevance for search, in accordance with various aspects of the present disclosure. Those actions in FIG. 4 that have been previously described in reference to FIGS. 1-3 may not be described again herein for purposes of clarity and brevity. The actions of the process depicted in the flow diagram of FIG. 4 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure. It should be appreciated that while the example of FIG. 4 describes determining the seasonal relevance of an item, the techniques described with respect to FIG. 4 may be equally applicable to a query, as described previously.

Process 400 may begin at action 402, at which text that describes a first item may be received. The text may include a description of the item, meta-information about the item (e.g., the seller, brand, etc.), a title of the item, etc. In some cases, other item information may be ingested by the seasonal relevance prediction system. For example, images of the item may be input into the seasonal relevance prediction system. In various examples, the text may be pre-processed (e.g., using lemmatization, stop word removal, stemming, tokenization, etc.).

Processing may continue at action 404, at which token embeddings representing the text received at action 402 may be generated by a language model. The token embeddings may be vectors representing each token of the input text. In various examples, the token embeddings may be concatenated. In various examples, each token embedding may represent a different word of the text. In some examples, each token embedding may represent a different n-gram of the text. The token embeddings may semantically represent the text. In some cases, the token embeddings may be passed through a feed-forward layer (e.g., feed forward layer 206) to reduce dimensionality prior to further processing (e.g., by self attention layer(s) 210).

Processing may continue at action 408, at which a seasonal relevance vector may be predicted for the first item. The seasonal relevance vector may be generated using the token embeddings as described above. The seasonal relevance vector may be predicted based on a similarity between the text describing the first item and at least one other item for which periodic sales concentration data (e.g., MSC) is available. In various examples, the neural network architecture may use one or more self-attention layers to determine the relative importance of the various tokens. Thereafter, a prediction layer (or layers) may take as input the encoded output from the self-attention layers and may generate a predicted seasonal relevance vector.

Processing may continue at action 410, at which the seasonal relevance vector may be output. The seasonal relevance vector may include a respective seasonal relevance score for each relevant time period. For example, a predicted seasonal relevance score for each month, each week, each season, etc., depending on how the seasonal relevance vector is defined.

Processing may continue at action 412, at which feature data may be computed using the seasonal relevance vector. The feature data may transform the seasonal relevance vector into a form that is used as an input to a search algorithm (e.g., an LTR algorithm). Processing may continue to action 414, at which the feature may be used as an input into a search algorithm. The search algorithm may be effective to retrieve and/or rank content based at least in part on the feature that represents the seasonal relevance of the first item.

Figure 5:
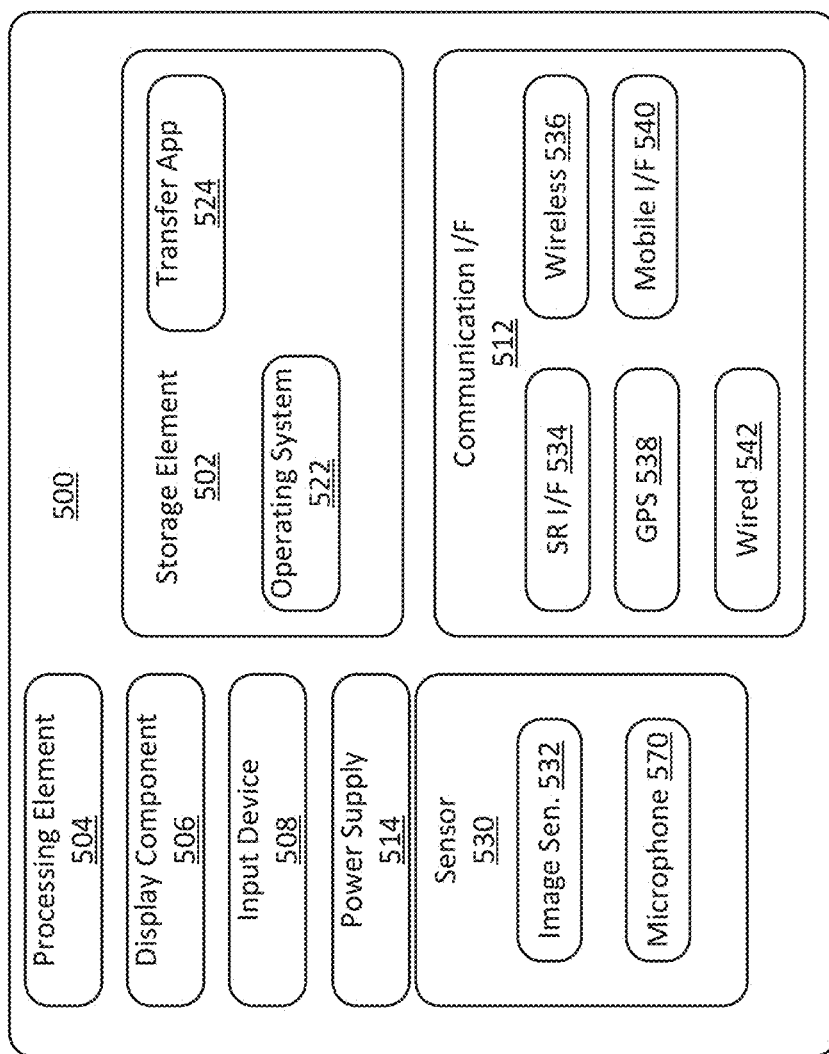
FIG. 5 is a block diagram showing an example architecture of a computing device that may be used in accordance with various aspects of the present disclosure.

FIG. 5 is a block diagram showing an example architecture 500 of a computing device that may be used to instantiate the various machine learning models such as the backbone networks and/or the transformer models described herein, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display suggested personalized search queries generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 604, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information. In some further examples, the image sensor 532 may comprise a depth sensor and/or multiple depth sensors. For example, the image sensor 532 may include a TOF sensor, stereoscopic depth sensors, a lidar sensor, radar, etc.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
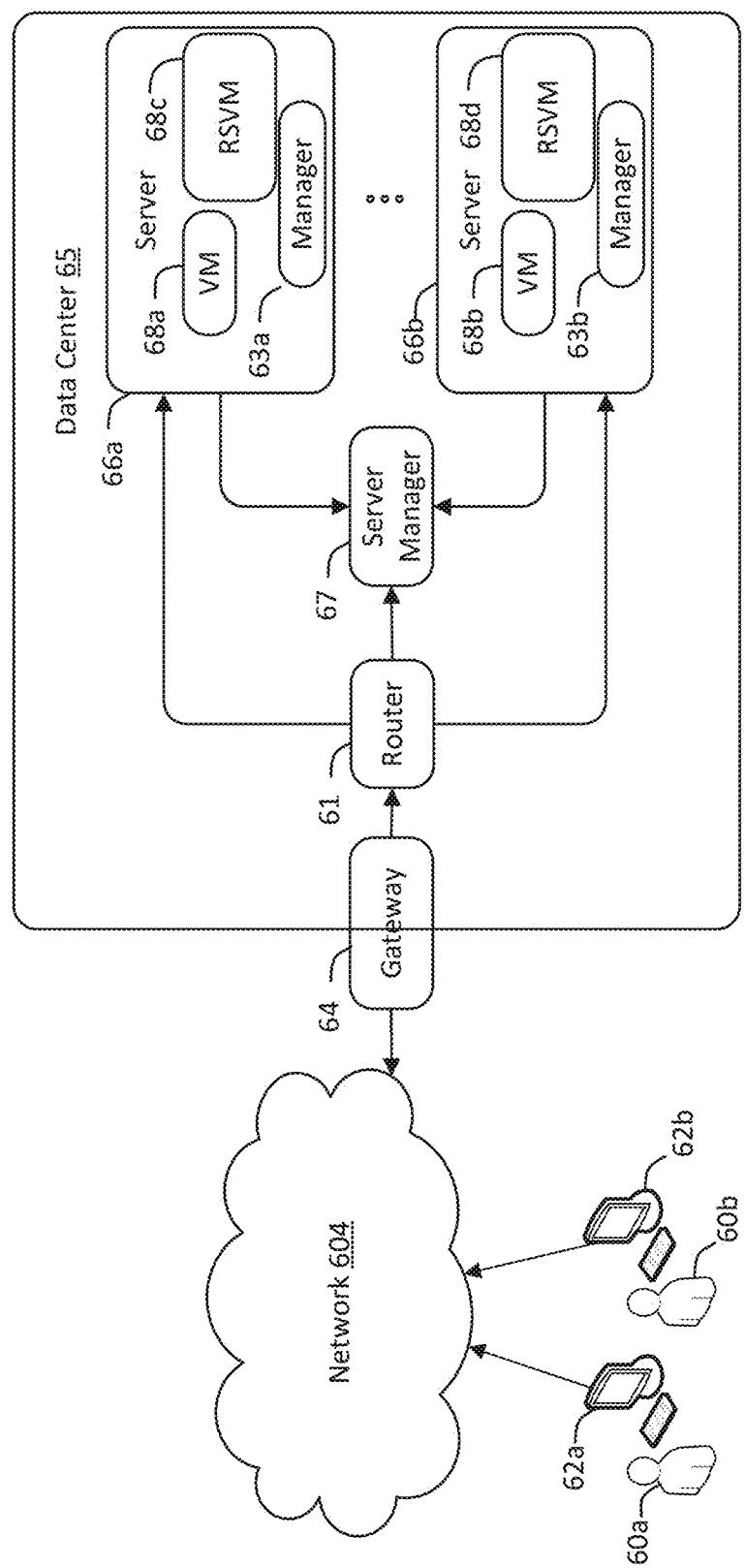
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various machine learning models described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 604. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources-consisting of many processors, large amounts of memory and/or large storage capacity—and small resources-consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 604 may, for example, be a publicly accessible network of linked networks and possibly operated by various distinct parties, such as the Internet. In other embodiments, network 604 may be a private network, such as a corporate or university network that is wholly or partially inaccessible to non-privileged users. In still other embodiments, network 604 may include one or more private networks with access to and/or from the Internet.

Network 604 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 604. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++, and the like, or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of online search using seasonal relevance, comprising:
    determining text comprising at least one of a title or a description of an item;
    generating, using a language model executed by at least one processor, an encoded representation of the text comprising token embeddings and positional embeddings, wherein each respective token embedding is associated with a respective positional encoding representing an order of that token with respect to other tokens of the text;
    generating, using at least one self-attention layer, a modified encoded representation of the text based at least in part on using an attention mechanism on the token embeddings and positional embeddings, wherein the modified encoded representation comprises modified token embeddings, wherein each of the token embeddings is modified by incorporating context from at least one other token embedding of the token embeddings:
    generating, based at least in part by inputting the modified encoded representation into at least one decoder implemented using a neural network, an output vector comprising twelve elements using a Softmax function executed by the at least one processor, wherein each of the twelve elements corresponds to a different month of a year and wherein a value of each of the twelve elements represents a seasonality score representing a prediction of seasonal relevance for the item for that month, wherein the prediction of seasonal relevance is determined based on monthly sales concentrations (MSC) of items comprising semantically-similar text;
    receiving the output vector by a search algorithm;
    determining, by the search algorithm, a first rank for the item among a plurality of items based on a first seasonal relevance score indicated by the output vector, wherein the first seasonal relevance score is associated with a first month during which the search algorithm is executed; and
    causing display of a ranked list of the plurality of items.

2. The computer-implemented method of claim 1, further comprising:
    determining, by the search algorithm for a first query related to the item, the first query received during the first month, the first rank for the item based on the first seasonal relevance score for the first month; and
    determining, by the search algorithm for the first query related to the item, the first query received during a second month, a second rank for the item based on a second seasonal relevance score for the second month, wherein the first rank is higher than the second rank based on the first seasonal relevance score being higher than the second seasonal relevance score.

3. The computer-implemented method of claim 1, further comprising:
    training the neural network using at least a first training sample, the first training sample comprising:
        a title and/or a description of a second item; and
        a seasonality vector for the second item, wherein the seasonality vector includes twelve elements, wherein each of the twelve elements represents the MSC for the second item over a period of one year.

4. A method comprising:
    receiving text data representing text describing a first item;
    generating, using at least one encoder of a language model executed by at least one processor, an encoded representation of the text comprising a plurality of token embeddings and positional embeddings, wherein each respective token embedding is associated with a respective positional embedding representing an order of that token with respect to other tokens of the text;
    generating, using at least one self-attention layer, a modified encoded representation of the text based at least in part on using an attention mechanism on the plurality of token embeddings and positional embeddings, wherein the modified encoded representation represents modified token embeddings, wherein each token embedding is modified by incorporating context from at least one other token embedding of the plurality of token embeddings:
    predicting, by inputting the modified encoded representation into a first neural network executed by the at least one processor, a seasonal relevance vector associated with the first item, wherein the seasonal relevance vector is predicted based at least in part on a similarity between the modified encoded representation of the text describing the first item and at least one other encoded representation of text describing a different item for which periodic sales concentration data is available, the periodic sales concentration data describing a percentage of per-time period sales for the different item;

generating, by the at least one processor, seasonal relevance vector data representing a respective seasonal relevance score for one or more time periods;

inputting the seasonal relevance vector data into a search algorithm;

ranking, by the search algorithm, for a first query, a plurality of items comprising the first item based on a first time period of the one or more time periods during which the first query was received and a first seasonal relevance score for the first time period; and causing display of a ranked list of the plurality of items based at least in part on the ranking of the plurality of items.

5. The method of claim 4, further comprising:
generating feature data representing the seasonal relevance vector data;
inputting the feature data into the search algorithm; and
ranking, by the search algorithm for the first query, the first item based on the feature data.

6. The method of claim 4, wherein the periodic sales concentration data comprises, for each of the one or more time periods, a percentage of sales of the first item occurring in the respective time period of the one or more time periods normalized by total sales of a set of items including the first item during the respective time period.

7. The method of claim 4, further comprising:
inputting the positional embeddings into the first neural network, wherein the seasonal relevance vector is determined further based at least in part on the positional embeddings.

8. The method of claim 7, wherein the first neural network employs a self-attention mechanism to determine a relationship between different tokens of the text data based at least in part on the respective positional embedding for each token.

9. The method of claim 4, further comprising training the first neural network using a training sample comprising:
second text data representing second text describing a second item; and
historical periodic sales concentration data for the second item.

10. The method of claim 9, further comprising determining cross entropy loss between a predicted seasonal relevance vector for the second item, predicted by the first neural network, and the historical periodic sales concentration data for the second item.

11. The method of claim 4, wherein:
the language model is a pre-trained language model trained separately from the first neural network; and
the plurality of token embeddings are combined into reduced dimensionality embedding data using a feed-forward network of the first neural network.

12. The method of claim 4, further comprising:
receiving, by the search algorithm during a first month, a second query;
determining, for the second query received during the first month, a second item associated with second seasonal relevance vector data and a third item associated with third seasonal relevance vector data;

determining, based at least in part on a comparison of the second seasonal relevance vector data and the third seasonal relevance vector data that the second item is more likely to be selected during the first month than the third item; and generating a ranked list in response to the second query, wherein the second item is ranked higher than the third item in the ranked list based at least in part on the comparison of the second seasonal relevance vector data and the third seasonal relevance vector data.

13. A method comprising:
receiving a first query comprising text;
generating, using at least one encoder of a language model executed by at least one processor, an encoded representation of the text comprising a plurality of token embeddings and positional embeddings, wherein each respective token embedding is associated with a respective positional embedding representing an order of that token with respect to other tokens of the text;

generating, using at least one self-attention layer, a modified encoded representation of the text based at least in part on using an attention mechanism on the plurality of token embeddings and positional embeddings, wherein the modified encoded representation represents modified token embeddings, wherein each token embedding is modified by incorporating context from at least one other token embedding of the plurality of token embeddings:

predicting, by inputting the modified encoded representation into a first neural network executed by the at least one processor, a seasonal relevance vector associated with the first query, wherein the seasonal relevance vector is predicted based at least in part on a similarity between the modified encoded representation of the text of the first query and at least one other encoded representation of text describing a different query for which periodic query concentration data is available, the periodic query concentration data describing a percentage of per-time period incidences of past queries that include the text describing the different query;

generating, by the at least one processor, seasonal relevance vector data, the seasonal relevance vector data representing a respective seasonal relevance score for one or more time periods;

inputting the seasonal relevance vector data into a search algorithm;

ranking, by the search algorithm for the first query, a plurality of items based on a first time period of the one or more time periods during which the first query was received and a first seasonal relevance score for the first time period; and causing display of a ranked list of the plurality of items based at least in part on the ranking of the plurality of items.

14. The method of claim 13, further comprising:
generating feature data representing the seasonal relevance vector data;
inputting the feature data into the search algorithm; and
ranking, by the search algorithm, items based on the feature data representing a seasonal relevance of the first query.

15. The method of claim 13, wherein the periodic query concentration data comprises, for each of the one or more time periods, a percentage of past queries that include the text occurring in the respective time period of the one or more time periods normalized by total queries received during the respective time period.

16. The method of claim 13, further comprising:
inputting the positional embeddings into the first neural network, wherein the seasonal relevance vector is determined further based at least in part on the positional embeddings.

17. The method of claim 16, wherein the first neural network employs a self-attention mechanism to determine a relationship between different tokens of the text based at least in part on the respective positional embedding for each token.

18. The method of claim 13, further comprising training the first neural network using a training sample comprising:
second text of a second query; and
historical periodic query concentration data for the second query.

19. The method of claim 18, further comprising determining cross entropy loss between a predicted seasonal relevance vector for the second query, predicted by the first neural network, and the historical periodic query concentration data for the second query.

20. The method of claim 13, wherein:
the language model is a pre-trained language model trained separately from the first neural network; and
the plurality of token embeddings are combined into reduced dimensionality embedding data using a feed-forward network of the first neural network.

* * * * *